United States Patent
Seyama

(10) Patent No.: US 10,390,258 B2
(45) Date of Patent: Aug. 20, 2019

(54) BASE STATION DEVICE, TERMINAL DEVICE, AND WIRELESS TRANSMISSION METHOD

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/685,051

(22) Filed: Aug. 24, 2017

(65) Prior Publication Data

US 2018/0077604 A1   Mar. 15, 2018

(30) Foreign Application Priority Data

Sep. 15, 2016   (JP) ................. 2016-180367

(51) Int. Cl.
| | |
|---|---|
| H04W 28/06 | (2009.01) |
| H04L 5/00 | (2006.01) |
| H04W 52/24 | (2009.01) |
| H04W 72/04 | (2009.01) |
| H04W 52/34 | (2009.01) |
| H04W 8/24 | (2009.01) |
| H04W 84/12 | (2009.01) |
| H04W 88/08 | (2009.01) |

(52) U.S. Cl.
CPC ........... *H04W 28/06* (2013.01); *H04L 5/0048* (2013.01); *H04W 52/247* (2013.01); *H04W 52/346* (2013.01); *H04W 72/0453* (2013.01); *H04L 5/0058* (2013.01); *H04W 8/24* (2013.01); *H04W 84/12* (2013.01); *H04W 88/08* (2013.01)

(58) Field of Classification Search
CPC .................................................. H04W 28/06
USPC .................................................. 375/130
See application file for complete search history.

(56) References Cited

U.S. PATENT DOCUMENTS

2009/0238292 A1* 9/2009 Clerckx ............... H04B 7/043
375/260
2011/0053630 A1 3/2011 Higuchi
(Continued)

FOREIGN PATENT DOCUMENTS

| EP | 2273716 | 1/2011 |
|---|---|---|
| JP | 2011-041259 | 2/2011 |

(Continued)

OTHER PUBLICATIONS

Q. H. Spencer et al., "Zero-Forcing Methods for Downlink Spatial Multiplexing in Multiuser MIMO Channels", IEEE Transactions on Signal Processing, vol. 52, No. 2, pp. 461-471, Feb. 2004 (11 pages).

*Primary Examiner* — Lihong Yu
(74) *Attorney, Agent, or Firm* — Fujitsu Patent Center

(57) ABSTRACT

A base station device includes: a processor that executes a process including determining which group of a first group and a second group each of a plurality of terminal devices belongs to, generating a transmission weight to form a transmission beam having a shape considering only a terminal device that belongs to the first group out of the terminal devices, and multiplying a signal addressed to the terminal devices by the generated transmission weight; and a transmitter that transmits the signal multiplied by the transmission weight from a plurality of antennas simultaneously.

7 Claims, 14 Drawing Sheets

(56) References Cited

U.S. PATENT DOCUMENTS

2012/0155341 A1* 6/2012 Yamamoto ........... H04B 7/0617
                                                370/281
2012/0218961 A1   8/2012 Goto et al.
2013/0084908 A1* 4/2013 Joo ..................... H04W 72/046
                                                455/509
2016/0211898 A1* 7/2016 Cai ..................... H04B 7/0617

FOREIGN PATENT DOCUMENTS

| JP | 2011-066771   | 3/2011  |
|----|---------------|---------|
| JP | 2015-211282   | 11/2015 |
| WO | WO2009-119051 | 10/2009 |

* cited by examiner

BASE STATION DEVICE, TERMINAL DEVICE, AND WIRELESS TRANSMISSION METHOD

CROSS-REFERENCE TO RELATED APPLICATION

This application is based upon and claims the benefit of priority of the prior Japanese Patent Application No. 2016-180367, filed on Sep. 15, 2016, the entire contents of which are incorporated herein by reference.

FIELD

The embodiments discussed herein are related to a base station device, a terminal device, and a wireless transmission method.

BACKGROUND

In recent years, a multiuser multi-input multi-output (MIMO) technique in which data is transmitted simultaneously to multiple user equipment devices (UEs) from a base station that has multiple transmission antennas has been receiving attention. As the multiuser MIMO (hereinafter, "MU-MIMO") enables data transmission to multiple UE at the same time using the same frequency, throughput of a wireless communication system can be improved.

In the MU-MIMO, to prevent data to multiple UE from interfering with each other, methods such as zero forcing in which a transmission signal is multiplied by a transmission weight and block diagonalization can be applied. The transmission weight is a weight to adjust the phase and the amplitude of a transmission signal, and by determining the transmission weight according to a channel between the base station device and UE, transmission signals to multiple UE are orthogonalized to each other, thereby reducing the interference.

Non-Patent Document 1: Q. H. Spencer, A. L. Swindlehurst, M. Haardt, "Zero-Forcing Methods for Downlink Spatial Multiplexing in Multiuser5 MIMO Channels", *IEEE Trans. Signal Process, vol,* 52, no. 2, pp. 461-471, February, 2004

However, for example, when UE moves, or when a radio wave scattering object around the UE moves, the channel between the base station device and the UE varies every moment by fading. Therefore, the transmission weight optimal to the UE also varies by the variation of the channel, and such a problem arises that the inter-user interference is not reduced sufficiently. That is, because the states of the channel differ from each between when the transmission weight is calculated and when transmission data is actually been transmitted, there is a case where a transmission beam according to the transmission weight is not the optimal one at the time when the transmission data is transmitted.

Specifically, for example, as depicted in FIG. 16, a case in which a transmission beam for UE 20a expressed by a curve B in the drawing is formed when a base station device 10 transmits data to UEs 20a and 20b at the same time is explained. In FIG. 16, a peak of the curve B indicates a direction of a high beam gain, and a valley of the curve B indicates a direction of a null at which the beam gain is 0.

As depicted in the drawing, in the transmission beam for the UE 20a, the beam gain is high in the direction of the UE 20a. On the other hand, not to interfere the UE 20b, a null is directed to the UE 20b in the transmission beam for the UE 20a. However, the UE 20b moves during a period from when the transmission weight for the UE 20a is formed until when the transmission beam is actually formed. As a result, when the transmission beam is actually formed and a signal is transmitted, the UE 20b is not positioned at the direction of a null of the transmission beam for the UE 20a, and the signal to the UE 20a interferes the UE 20b. That is, the orthogonalizing between the UEs by the transmission weight is collapsed, and the inter-user interference occurs. As a result of occurrence of the inter-user interference, the throughput of the wireless communication system is reduced.

SUMMARY

According to an aspect of an embodiment, a base station device includes: a processor that executes a process including determining which group of a first group and a second group each of a plurality of terminal devices belongs to, generating a transmission weight to form a transmission beam having a shape considering only a terminal device that belongs to the first group out of the terminal devices, and multiplying a signal addressed to the terminal devices by the generated transmission weight; and a transmitter that transmits the signal multiplied by the transmission weight from a plurality of antennas simultaneously.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are not intended to limit the present invention.

[a] First Embodiment

Figure 1:
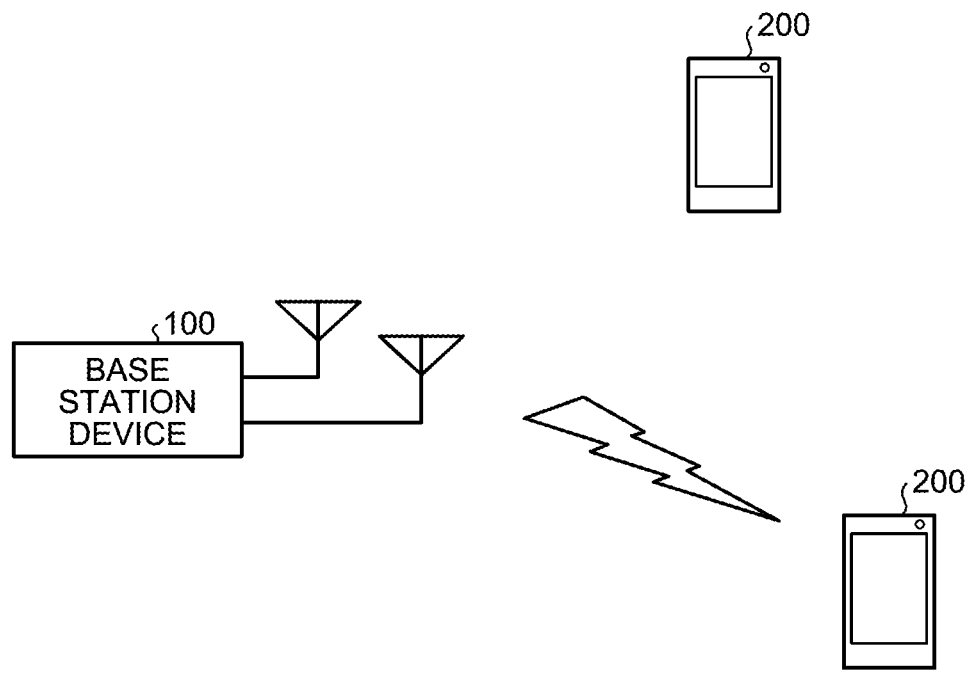
FIG. 1 depicts a configuration of a wireless communication system according to a first embodiment.

FIG. 1 depicts a configuration of a wireless communication system according to a first embodiment. As depicted in FIG. 1, the wireless communication system includes a base station device 100 and multiple user equipment devices (UEs) 200.

The base station device 100 performs wireless communication by the MU-MIMO with the multiple UEs 200. That is, the base station device 100 has multiple antennas, and performs wireless communication with the multiple UEs 200 at the same time using the same frequency. At this time, the base station device 100 groups the UEs into a low-speed UE group to which a UE at a moving speed lower than a predetermined threshold belongs and a high-speed UE group to which a UE at a moving speed equal to or higher than the predetermined threshold belongs, and determines transmission weights giving consideration to the direction of the low-speed UE, while not giving consideration to the direction of the high-speed UE.

In other words, when forming a transmission beam for one of the low-speed UEs, the base station device 100 determines the transmission weight such that nulls are directed to the direction of the other low-speed UEs. Moreover, when forming a transmission beam for the high-speed UE, the base station device 100 determines the transmission weight such that a null is directed to all of the low-speed UEs. Therefore, the base station device 100 determines the transmission weight giving consideration only to the direction of the low-speed UE, out of the high-speed UE and the low-speed UE.

The UE 200 receives a signal transmitted from the base station device 100. A reception signal received by the UE 200 includes user data addressed to the own UE, and when the own UE is moving at a low speed, interference from user data addressed to the other UEs 200 is reduced. Furthermore, the UE 200 transmits a signal including, for example, ACK/NACK indicating whether reception of a downlink signal has succeeded, channel state information indicating the state of a downlink channel, and the like to the base station device 100.

Figure 2:
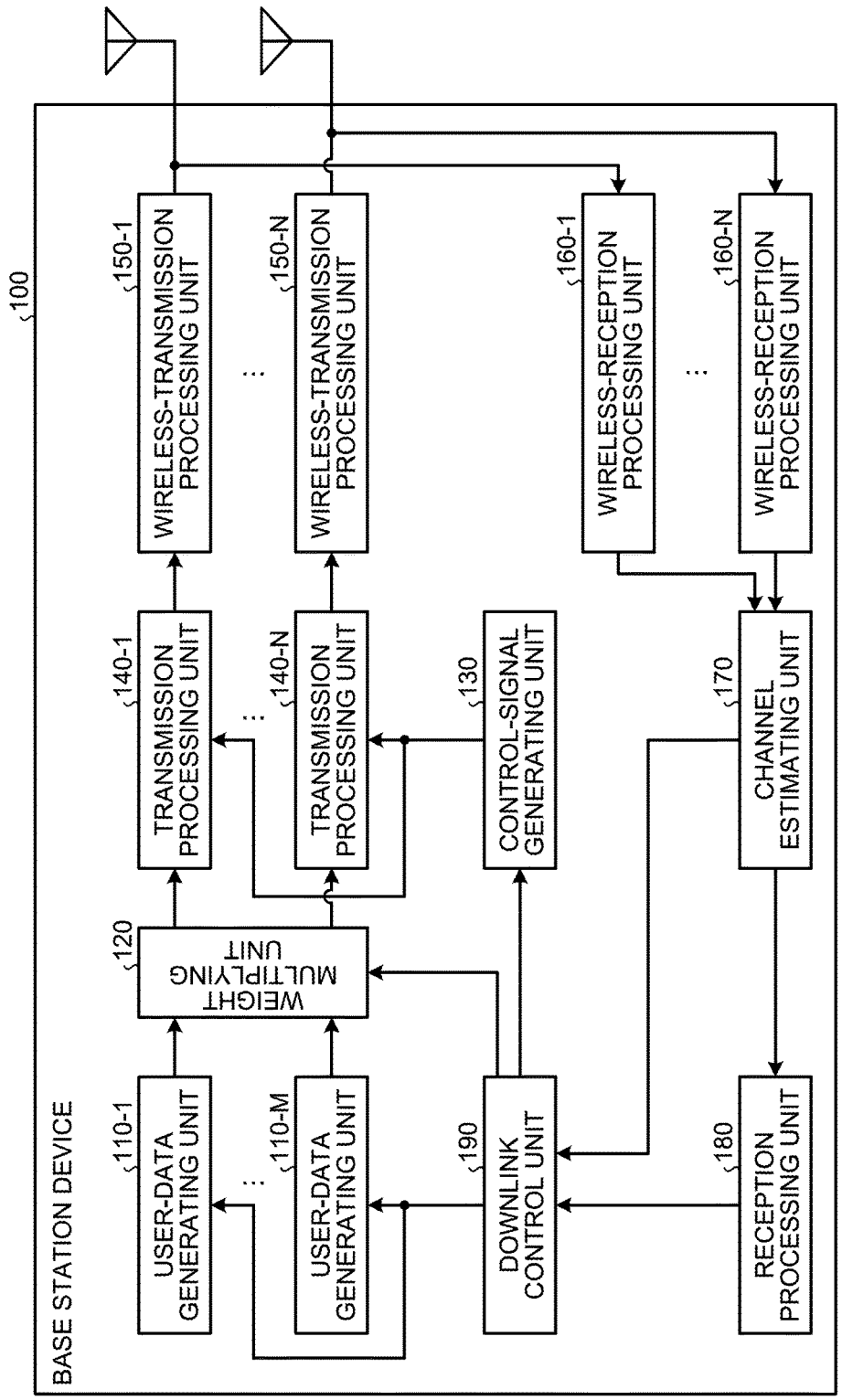
FIG. 2 is a block diagram depicting a configuration of a base station device according to the first embodiment.

FIG. 2 is a block diagram depicting a configuration of the base station device 100 according to the first embodiment. The base station device 100 depicted in FIG. 2 includes user-data generating units 110-1 to 110-M (M is a positive integer equal to or larger than 2), a weight multiplying unit 120, a control-signal generating unit 130, transmission processing units 140-1 to 140-N (N is a positive integer equal to or larger than 2), wireless-transmission processing units 150-1 to 150-N, wireless-reception processing unit 160-1 to 160-N, a channel estimating unit 170, a reception processing unit 180, and a downlink control unit 190.

Figure 3:
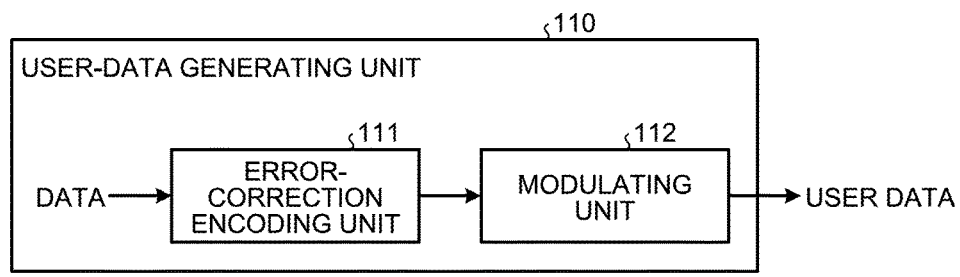
FIG. 3 is a block diagram depicting a configuration of a user-data generating unit.

The user-data generating units 110-1 to 110-M generate user data addressed to various UEs 200 in accordance with an instruction from the downlink control unit 190. That is, the user-data generating units 110-1 to 110-M generate user data addressed to M units of the UEs 200 at the maximum that have been determined to be the destination at the same time by the downlink control unit 190. Specifically, each of the user-data generating unit 110-1 to 110-M includes, for example, an error-correction encoding unit 111 and a modulating unit 112 as depicted in FIG. 3.

The error-correction encoding unit 111 subjects an individual piece of data addressed to the UE 200 to error-correction encoding, and outputs acquired encoded data to the modulating unit 112.

The modulating unit 112 modulates the encoded data that is output from the error-correction encoding unit 111, and outputs acquired user data to the weight multiplying unit 120.

The encoding rate in the error-correction encoding unit 111 and the modulation method in the modulating unit 112 are instructed by the downlink control unit 190. That is, a modulation and coding scheme (MCS) to be applied to the user data is specified by the downlink control unit 190.

Referring back to FIG. 2, the weight multiplying unit 120 multiplies the user data to the M units of the UEs 200 at the maximum generated by the user-data generating units 110-1 to 110-M by a transmission weight. Specifically, the weight multiplying unit 120 acquires a weight matrix and a power matrix that are generated by the downlink control unit 190, and multiplies the user data by the transmission weight acquired from the acquired matrices.

The control-signal generating unit 130 generates a control signal addressed to the UE 200 in accordance with an instruction by the downlink control unit 190. That is, the control-signal generating unit 130 generates a control signal that includes a result of scheduling performed by the downlink control unit 190, information about the MCS, and the like.

Figure 4:
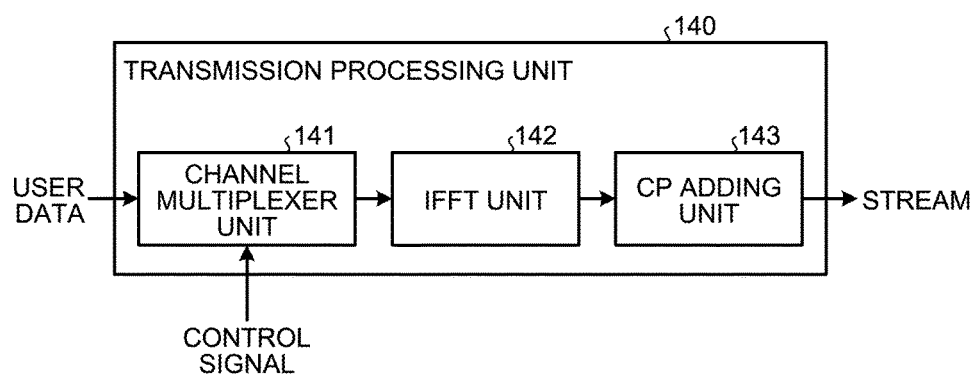
FIG. 4 is a block diagram depicting a configuration of a transmission processing unit.

The transmission processing units 140-1 to 140-N generate a stream transmitted from each different antenna. That is, the transmission processing units 140-1 to 140-N generate a stream that is transmitted from N units of antennas used for the MU-MIMO. Specifically, the transmission processing units 140-1 to 140-N include, for example, a channel multiplexer unit 141, an inverse fast Fourier transform (IFFT) unit 142, and a cyclic-prefix (CP) adding unit 143 as depicted in FIG. 4.

The channel multiplexer unit 141 multiplexes the user data multiplied by the transmission weight and the control signal, and outputs acquired multiplexed data to the IFFT unit 142.

The IFFT unit 142 subjects the multiplexed data output from the channel multiplexer unit 141 to inverse fast Fourier transform, and generates effective symbols in which the multiplexed data is superimposed on respective subcarrier of different frequencies.

The CP adding unit 143 adds an end portion of the effective symbol that is output from the IFFT unit 142 at a head of the effective symbol as a CP, and generates an OFDM symbol. The OFDM symbol that is acquired by adding the CP by the CP adding unit 143 is to be a stream transmitted from each antenna.

Referring back to FIG. 2, the wireless-transmission processing units 150-1 to 150-N subject streams output from the respective transmission processing units 140-1 to 140-N to predetermined wireless transmission processing. Specifically, the wireless-transmission processing units 150-1 to 150-N, for example, digital/analog (D/A) convert and up-convert the streams, to transmit through the antennas.

The wireless-reception processing units 160-1 to 160-N respectively receive signals through the corresponding antennas, and subject wireless reception signals to predetermined wireless reception processing. Specifically, the wireless-reception processing units 160-1 to 160-N, for example, down-convert and analog/digital (D/A) convert the reception signal, to output to the channel estimating unit 170. The reception signals are signals transmitted from the respective UEs 200 and include, for example, ACK/NACK indicating whether reception of a downlink signal has succeeded, channel state information indicating the state of a downlink channel, and the like.

The channel estimating unit 170 acquires the reception signals from the wireless-reception processing units 160-1 to 160-N, and performs channel estimation between the UE 200 and the base station device 100. Specifically, the channel estimating unit 170 performs channel estimation of an uplink from each of the UEs 200 to the base station device 100 by using a reference signal such as a sounding reference signal (SRS) and a demodulation reference signal (DRS) included in the reception signal. Subsequently, the channel estimating unit 170 outputs a channel estimation value that is obtained as a result of the channel estimation to the reception processing unit 180 and the downlink control unit 190. In this example, it is assumed that an uplink channel estimated from the SRS and the like is equivalent to a downlink channel based on channel reciprocity in time division duplex (TDD). However, in a case of frequency division duplex (FDD), the channel state information indicating a state of a downlink channel feedbacked from each of the UEs 200 can be used.

The reception processing unit 180 demodulates the reception signal by using the channel estimation value output from the channel estimating unit 170, and acquires the ACK/NACK and the channel state information included in the reception signal. The reception processing unit 180 then outputs the ACK/NACK and the channel state information to the downlink control unit 190.

The downlink control unit 190 performs scheduling to determine a combination of the UEs 200 to be destinations at the same time, based on the channel state information. Moreover, the downlink control unit 190 groups the UEs 200 into the high-speed UE of a moving speed equal to or higher than a predetermined threshold and a low-speed UE of a moving speed lower than the predetermined threshold. The downlink control unit 190 calculates a weight for each UE to form a transmission beam in which a null is directed to the direction of the low-speed UE. Furthermore, the downlink control unit 190 allocates, to the high-speed UE, an extra power that is obtained by limiting a power for the stream addressed to the low-speed UEs.

Figure 5:
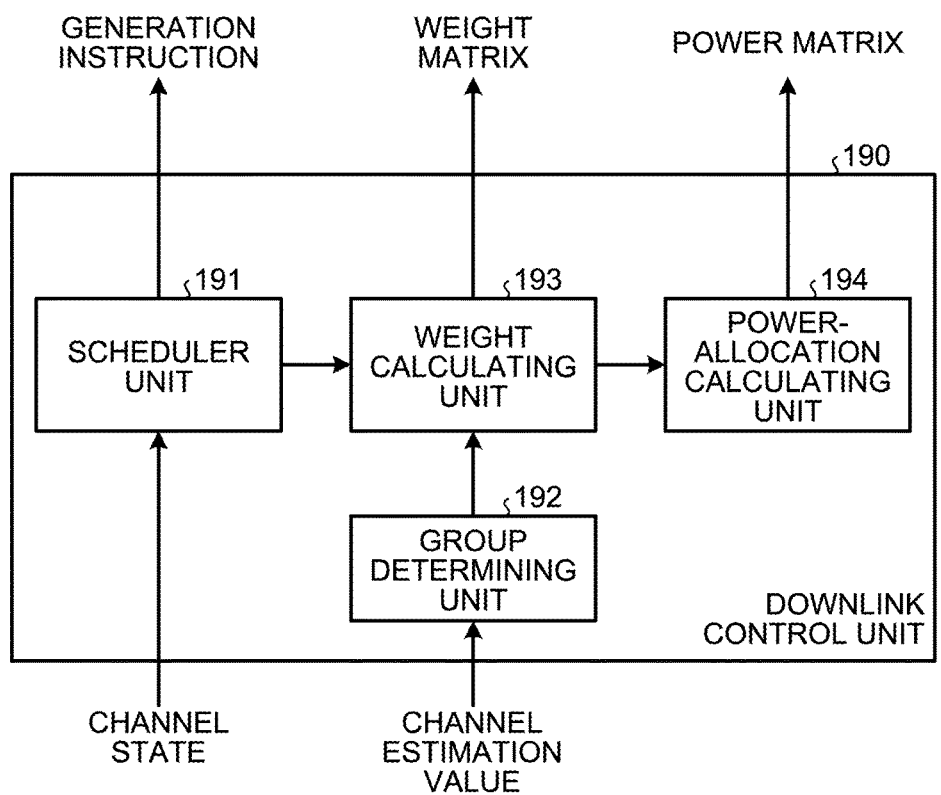
FIG. 5 is a block diagram depicting a configuration of a downlink control unit.

Specifically, the downlink control unit 190 includes, for example, a scheduler unit 191, a group determining unit 192, a weight calculating unit 193, and a power-allocation calculating unit 194 as depicted in FIG. 5.

The scheduler unit 191 acquires the channel state information from the reception processing unit 180, and performs scheduling based on a state of the channel between the base station device 100 and the respective UEs 200. That is, the scheduler unit 191 determines a combination of the multiple UEs 200 to be destinations at the same time, based on the state of the downlink channel. The scheduler unit 191 instructs the user-data generating units 110-1 to 110-M to generate user data addressed to the UEs 200 in the determined combination, and instructs the control-signal generating unit 130 to generate a control signal. Moreover, the scheduler unit 191 informs the weight calculating unit 193 of the determined combination of the UEs 200.

The group determining unit 192 acquires the channel estimation value from the channel estimating unit 170, and determines which group out of the low-speed UE and the high-speed UE each of the UEs 200 belongs, by estimating the moving speed of each of the UEs 200 from the channel estimation value. Specifically, the group determining unit 192 acquires, for example, a channel variation amount in a predetermined time period for each of the UEs 200 from the channel estimation value, and determines the UE 200 as the high-speed UE when the channel variation amount is equal to or larger than a predetermined threshold, and determines the UE 200 as the low-speed UE when the channel variation amount is smaller than the predetermined threshold. Alternatively, the group determining unit 192 can estimate the highest Doppler frequency from the channel variation amount, and can determine the group of each of the UE 200 based on a moving speed corresponding to the highest Doppler frequency. Furthermore, the group determining unit 192 can be informed of a moving speed from each of the UEs 200, and can determine the group of the UEs 200 based on the informed moving speed.

Informed of the combination of the UEs 200 to be the destination at the same time from the scheduler unit 191, the weight calculating unit 193 calculates a weight to form a transmission beam for each of the UEs 200. Specifically, for those UEs 200 that have been determined to belong to the low-speed UE, the weight calculating unit 193 calculates a weight to form a transmission beam in which nulls are directed to the low-speed UEs other than an intended low-speed UE. At this time, the weight calculating unit 193 calculates the weight without giving consideration to the direction of the high-speed UE.

In other words, when calculating a weight for the low-speed UE, the weight calculating unit 193 determines the direction of a null of the transmission beam giving consideration to the direction of the low-speed UEs other than the intended UE, while not giving consideration to the direction of the high-speed UE. Moreover, when calculating a weight for the high-speed UE, the weight calculating unit 193 determines the direction of a null of the transmission beam giving consideration to the directions of all of the low-speed UEs, while not giving consideration to the direction of the high-speed UE. That is, the weight calculating unit 193 calculates a weight to form a transmission beam that has a null for which the direction of the low-speed UE is taken into consideration out of the high-speed UE and the low-speed UE. Therefore, it is not necessary for the weight calculating unit 193 to direct a null toward the high-speed UE, and the flexibility of a transmission beam shape increases accordingly. As a result, for the weight calculating unit 193, it is facilitated to direct the maximum gain direction of the transmission beam toward the direction of the intended low-speed UE, and the power of a signal addressed to the low-speed UE is improved. Moreover, because nulls of the transmission beam for the other UEs 200 are directed to the direction of each of the low-speed UEs, the inter-user interference at the low-speed UE can be reduced.

As described the weight calculating unit 193 calculates a weight to form a transmission beam in which a null of the transmission beam is directed to the low-speed UE. Therefore, for example, when weights for the low-speed UEs, UE #1 and UE #2, and the high-speed UE, UE #3 are calculated, the weight calculating unit 193 acquires weights $W_1$ to $W_3$ satisfying following Equation (1).

$$\begin{bmatrix} H_1 \\ H_2 \\ H_3 \end{bmatrix} [ W_1 \quad W_2 \quad W_3 ] = \begin{bmatrix} H_1 W_1 & 0 & 0 \\ 0 & H_2 W_2 & 0 \\ H_3 W_1 & H_3 W_2 & H_3 W_3 \end{bmatrix} \quad (1)$$

In Equation (1), $H_1$ to $H_3$ are channel matrices of UE #1 to UE #3, respectively. Therefore, the right side of Equation (1) expresses a transmission beam that is formed for each of UE #1 to UE #3. In this example, as UE #1 and UE #2 are the low-speed UE, to direct the null toward the directions of UE #1 and UE #2, weights $W_1$ to $W_3$ in which elements corresponding to UE #1 and UE #2 in the right side in Equation (1) are 0 are acquired. The method of acquiring such a weight is described in detail later.

Acquiring a weight for each of the UEs 200, the weight calculating unit 193 generates a weight matrix in which respective weights are aligned, and outputs the generated weight matrix to the weight multiplying unit 120.

The power-allocation calculating unit 194 calculates a power allocation corresponding to each of the UEs 200 for which the weight has been calculated. Specifically, the power-allocation calculating unit 194 first sets a power of all streams of all of the UEs 200 to an initial power. The power-allocation calculating unit 194 then determines whether the initial power of a stream of the low-speed UE is higher than a predetermined upper limit power, and sets the power to the upper limit power for a stream, the initial power of which is higher than the upper limit power. Thus, the power for streams of the low-speed UEs all become equal to or lower than the predetermined upper limit power. Subsequently, the power-allocation calculating unit 194 subtracts a sum of the powers for the streams of the low-speed UEs from a total power in the base station device 100, to calculate a total power that can be allocated to the high-speed UE. The power-allocation calculating unit 194 allocates the calculated total power to the stream of the high-speed UE, and thus determines a power of each stream. As a result, the power for the stream of the high-speed UE is to be higher than the powers for the streams of the low-speed UEs. The calculation of allocated power is described in detail later.

Acquiring the powers for the respective streams for each of the UEs 200, the power-allocation calculating unit 194 generates a power matrix in which the powers for the respective streams are aligned, and outputs the generated power matrix to the weight multiplying unit 120.

Figure 6:
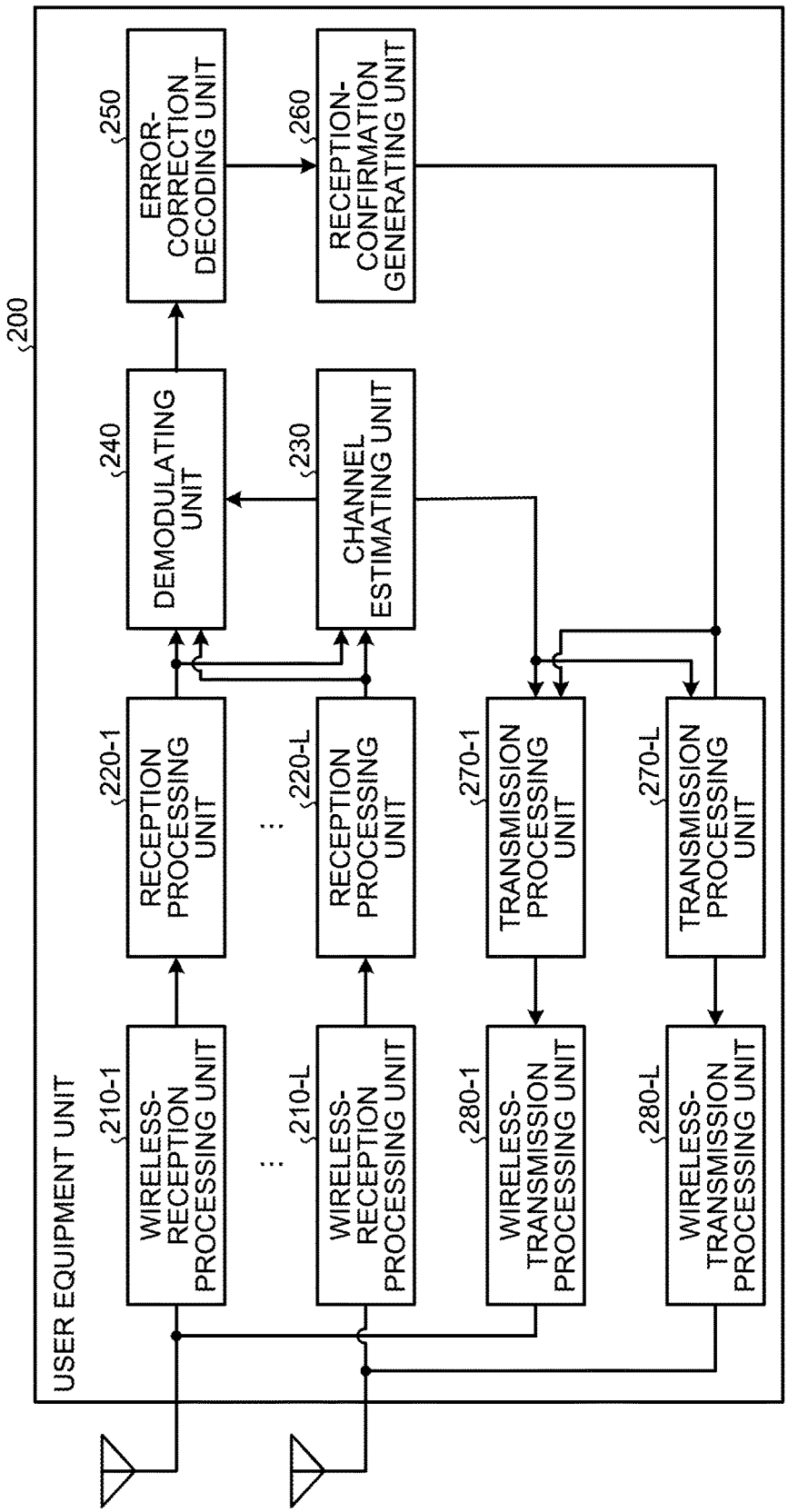
FIG. 6 is a block diagram depicting a configuration of a user equipment device according to the first embodiment.

FIG. 6 is a block diagram depicting a configuration of the user equipment device 200 according to the first embodiment. The user equipment device 200 depicted in FIG. 6 includes wireless-reception processing units 210-1 to 210-L (L is a positive integer equal to or larger than 2), reception processing units 220-1 to 220-L, a channel estimating unit 230, a demodulating unit 240. an error-correction decoding unit 250, a reception-confirmation generating unit 260, transmission processing units 270-1 to 270-L, and wireless-transmission processing units 280-1 to 280-L.

The wireless-reception processing units 210-1 to 210-L receive a signal through respectively corresponding antennas, and subject a reception signal to predetermined reception processing. Specifically, the wireless-reception processing units 210-1 to 210-L, for example, down-convert and A/D convert the reception signal, to output to the channel estimating unit 230 and the demodulating unit 240. The reception signal is a signal transmitted from the base station device 100, and includes user data, a control signal, and the like addressed to the respective UEs 200.

The reception processing units 220-1 to 220-L remove the CP from the reception signal of each antenna, and perform the fast Fourier transform. That is, the reception processing units 220-1 to 220-L acquire data that is superimposed on each subcarrier of the reception signal by performing predetermined reception processing on the reception signal.

The channel estimating unit 230 acquires the reception signals from the reception processing units 220-1 to 220-L, and performs channel estimation between the base station device 100 and the UE 200. Specifically, the channel estimating unit 230 performs channel estimation of a downlink to each of the UEs 200 from the base station device 100 by using a reference signal such as an SRS and a DRS included in the reception signal. Subsequently, the channel estimating unit 230 generates channel state information based on a result of the channel estimation, to output to the transmission processing units 270-1 to 270-L. Furthermore, the channel estimating unit 230 outputs the channel value that is obtained as a result of the channel estimation to the demodulating unit 240.

The demodulating unit 240 demodulates the reception signal by using the channel estimation value output from the channel estimating unit 230, and outputs the acquired demodulated signal to the error-correction decoding unit 250.

The error-correction decoding unit 250 subjects the demodulated signal output from the demodulating unit 240 to error correction decoding, and acquires user data addressed to the UE itself.

The reception-confirmation generating unit 260 checks a decoding result obtained by the error-correction decoding unit 250, and determines whether the user data has been received normally. The error-correction decoding unit 250 then generates ACK when the user data has been normally received, and generates NACK when retransmission of the user data is necessary, to output to the transmission processing units 270-1 to 270-L. That is, the reception-confirmation generating unit 260 generates the ACK/NACK that is the reception confirmation, and outputs it to the transmission processing units 270-1 to 270-L.

The transmission processing units 270-1 to 270-L generate a transmission signal addressed to the base station device 100. That is, the transmission processing units 270-1 to 270-L generate a transmission signal by encoding and demodulating the channel state information, the ACK/NACK, and the like in addition to the user data, and subject the transmission signal to transmission processing such as the inverse fast Fourier transform and CP addition.

The wireless-transmission processing units 280-1 to 280-L subject the transmission signals output from the respective transmission processing units 270-1 to 270-L to predetermined wireless transmission processing. Specifically, the wireless-transmission processing units 280-1 to 280-L, for example, D/A convert and up-convert the transmission signals, to transmit through the antennas.

Figure 7:
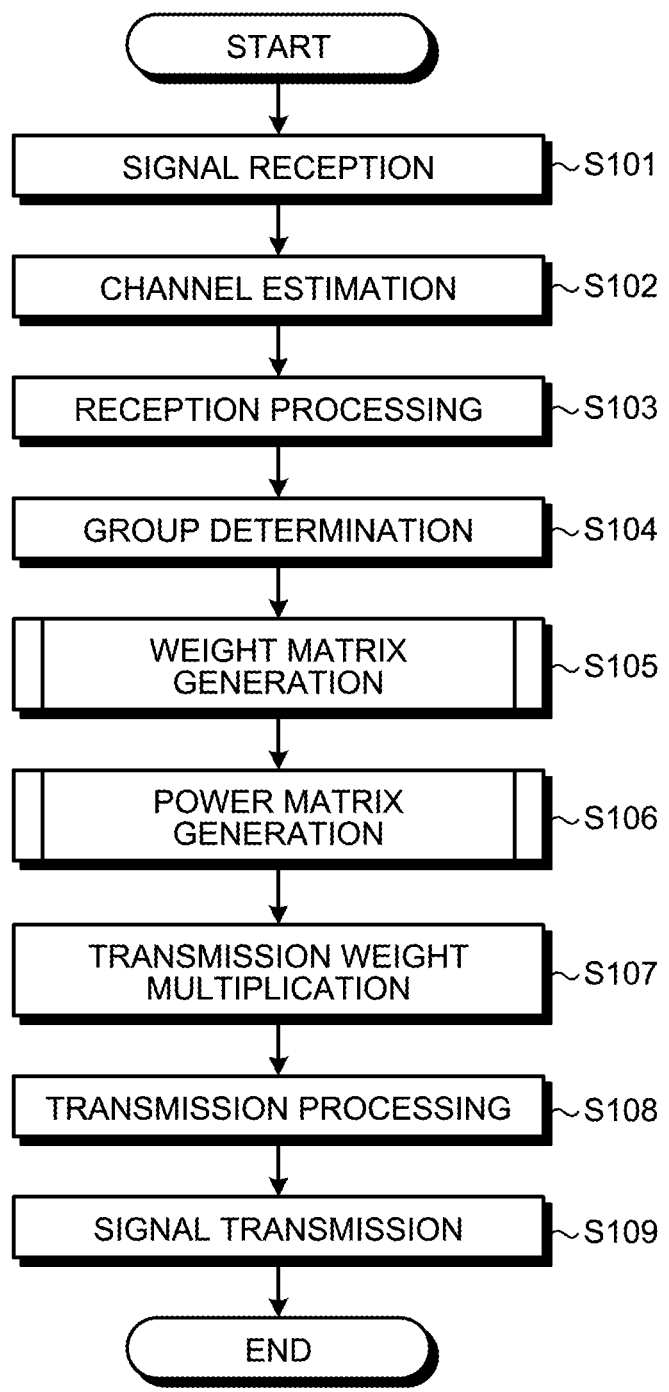
FIG. 7 is a flowchart of a wireless transmission method according to the first embodiment.

Next, the wireless transmission method by the base station device 100 is explained referring to a flowchart depicted in FIG. 7.

The base station device 100 receives signals transmitted respectively from the multiple UEs 200 (step S101). The reception signals are subjected to the wireless reception processing by the wireless-reception processing units 160-1 to 160-N, and the channel estimating unit 170 performs the channel estimation (step S102). Moreover, the reception processing unit 180 performs the reception processing of the reception signals (step S103), and the channel state information and the ACK/NACK informed by the respective UEs 200 are notified to the downlink control unit 190.

Subsequently, the scheduler unit 191 of the downlink control unit 190 performs scheduling based on the channel state information and the ACK/NACK. That is, a combination of the UEs 200 to be the destination at the same time is determined. According to a generation instruction from the scheduler unit 191, user data addressed to the UEs 200 of the determined combination is generated by the user-data generating units 110-1 to 110-M, and a control signal is generated by the control-signal generating unit 130.

On the other hand, the group determining unit 192 of the downlink control unit 190 performs grouping based on the channel estimation value (step S104). This grouping is grouping to categorize the UEs 200 into the high-speed UE and the low-speed UE according to the moving speed and, for example, categorizes the UE 200 having the channel variation amount according to the estimation value is equal to or larger than a predetermined threshold to the high-speed UE, and the UE 200 having the channel variation amount smaller than the predetermined threshold to the low-speed UE.

Following the scheduling and the grouping, the weight calculating unit 193 calculates a weight for each of the multiple UEs 200 to be the destination at the same time. That is, weights of the respective UEs 200 are determined such that nulls of transmission beams for the other UEs 200 are directed to each of the low-speed UEs out of the UEs 200 to be the destination at the same time. Subsequently, a weight matrix including the determined weights is generated (step S105), and the weight matrix is output to the weight multiplying unit 120. The generation of the weight matrix is described in detail later.

When the weights of the respective UEs 200 are calculated by the weight calculating unit 193, the power-allocation calculating unit 194 determines a power for a stream of each of the low-speed UEs and the high-speed UE. At this time, the power for a stream of the low-speed UE is suppressed to be equal to or lower than the upper limit power, and an extra power obtained by the suppression is allocated to a stream of the high-speed UE. Subsequently, a power matrix including the determined powers for respective stream is generated (step S106), and the power matrix is to be output to the weight multiplying unit 120. The generation of the power matrix is described in detail later.

The weight matrix and the power matrix are acquired by the weight multiplying unit 120, and a transmission weight by which use data is multiplied is determined from the weight matrix and the power matrix. The user data is multiplied by the transmission weight by the weight multiplying unit 120 (step S107), and a transmission beam for each of the UEs 200 is set. In either one of the transmission beams, a null is directed to the direction of the low-speed UE. Moreover, in the transmission beam for the low-speed UE, the direction of the corresponding low-speed UE and the largest gain direction of the transmission beam substantially matches with each other.

The user data in which the transmission beam has been set is subjected to the transmission processing by the transmission processing units 140-1 to 140-N (step S108), and streams addressed to the respective UEs 200 are generated. Furthermore, the respective streams are subjected to the wireless transmission processing by the wireless-transmission processing units 150-1 to 150-N, and transmitted from the corresponding antennas (step S109).

Figure 8:
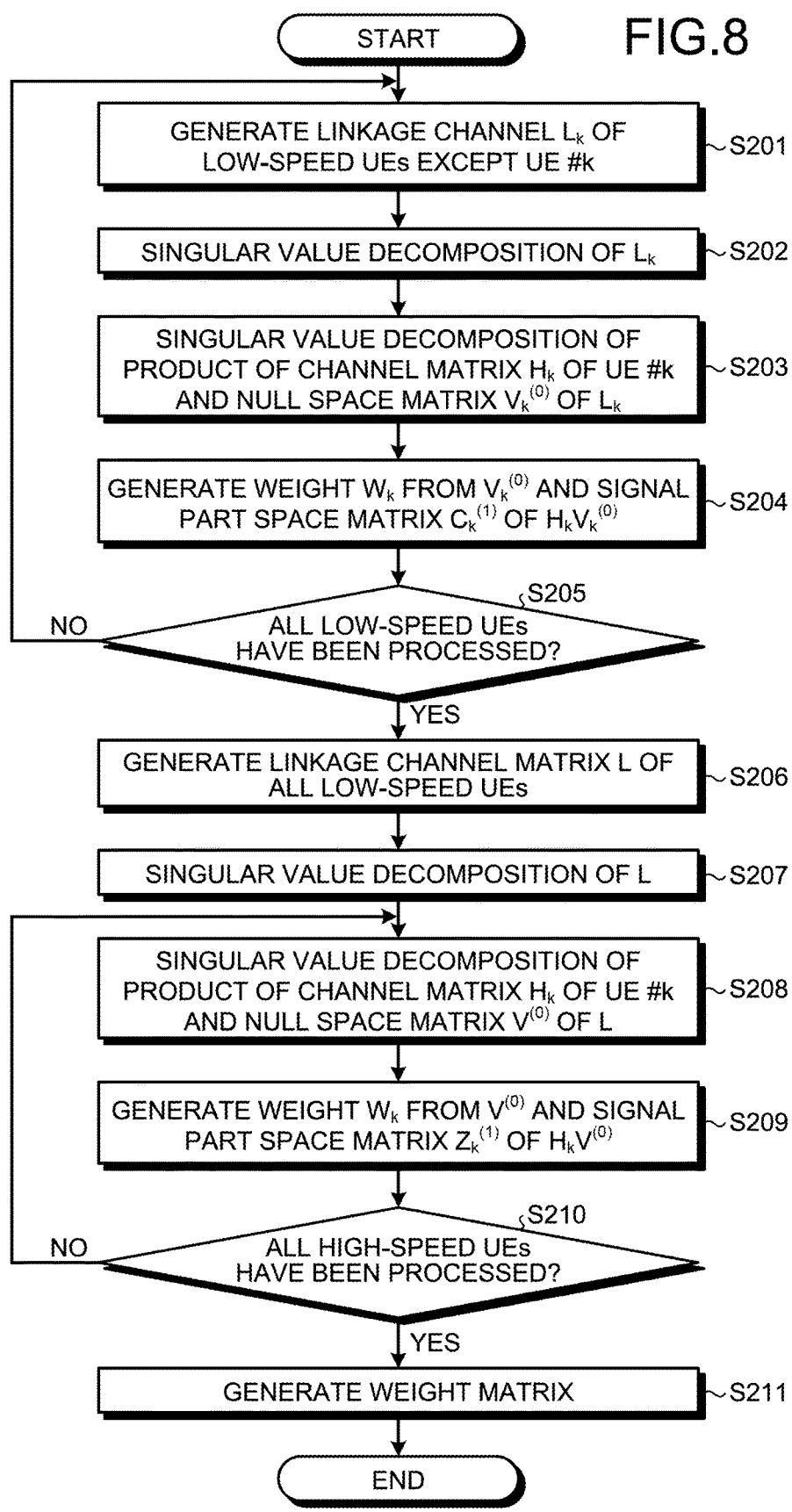
FIG. 8 is a flowchart of a weight-matrix generation processing.

Next, weight-matrix generation processing performed by the weight calculating unit 193 is specifically explained, referring to a flowchart in FIG. 8. In the following, it is assumed that the scheduler unit 191 plans to transmit signals to K units of the UEs 200 at the same time, and out of these UEs, 1st to $K_1$-th UEs 200 are the low-speed UE, and $K_1$+1-th to K-th UEs 200 are the high-speed UE.

The weight calculating unit 193 first calculates a weight for each of the low-speed UEs. Specifically, a linkage channel matrix $L_k$ of the low-speed UEs other than one unit of UE #k (k=1 to $K_1$) that is the low-speed UE of the subject of weight calculation is generated as following Equation (2) (step S201).

$$L_k = [H_1^T \ldots H_{k-1}^T H_{k+1}^T \ldots H_{K_1}^T]^T \quad (2)$$

In Equation (2) above, $H_1$ to $H_{K1}$ express channels from the base station device 100 to UE #1 to #$K_1$, respectively, and it is indicated that $A^T$ is a transpose of a matrix A. Therefore, the linkage channel matrix $L_k$ in above Equation (21) is a matrix obtained by aligning channels of the low-speed UEs except UE #k that is the subject of weight calculation. In this example, as the subject of the weight calculation, UE #k is the low-speed UE, a weight in which a null is directed to the direction of the low-speed UE other than this UE #k is calculated. Therefore, in the linkage channel matrix $L_k$, the channels of the low-speed UEs to which the null is directed and that are other than UE #k is arranged.

The linkage channel matrix $L_k$ is subjected to singular value decomposition (step S202), and transformed as Equation (3) below.

$$L_k = U_k [S_k^{(1)} O][V_k^{(1)} V_k^{(0)}]^H \quad (3)$$

$U_k$ is a matrix in which left singular vectors of the linkage channel matrix $L_k$ are aligned, and $S_k^{(1)}$ is a diagonal matrix in which singular values of the linkage channel matrix $L_k$ are aligned as diagonal entries, and O is a zero matrix in which all entries are 0. Moreover, $V_k^{(1)}$ is a matrix in which bases of a signal part space of the linkage channel matrix $L_k$ are aligned, and $V_k^{(0)}$ is a matrix in which bases of a null space of the linkage channel matrix $L_k$ are aligned. $A^H$ indicates that it is a complex conjugate transpose matrix of the matrix A.

Further transforming Equation (3) above, Equation (4) below is acquired, $$L_k [V_k^{(1)} V_k^{(0)}] = U_k [S_k^{(1)} O] \quad (4)$$

and it is understood that $L_k V_k^{(0)} = O$. Therefore, setting the matrix $V_k^{(0)}$ to the weight of UE #k, the channels from the base station device 100 to the low-speed UEs other than UE #k can be regarded as the zero matrix, and a null can be thus directed to these low-speed UEs. Accordingly, to generate a weight according to the number of streams υk to be transmitted to the UE #k from the matrix $V_k^{(0)}$, a product of the channel matrix $H_k$ of UE #k and the matrix $V_k^{(0)}$ is subjected to the singular value decomposition (step S203). The result is expressed by Equation (5) below.

$$H_k V_k^{(0)} A_k [B_k O][C_k^{(1)} C_k^{(0)}]^H \quad (5)$$

In above Equation (5), $A_k$ is a matrix in which left singular vectors of a matrix of the product $H_k V_k^{(0)}$ are aligned, and $B_k$ is a diagonal matrix in which singular values of the matrix of the product $H_k V_k^{(0)}$ are aligned as diagonal entries in descending order from upper left. Moreover, $C_k^{(1)}$ is a matrix in which bases of a signal part space of the matrix of the product $H_k V_k^{(0)}$ are aligned, and $C_k^{(0)}$ is a matrix in which bases of a null space of the matrix of the product $H_k N_k^{(0)}$ are aligned.

As the matrix $C_k^{(1)}$ in which bases of the signal part space of the matrix of the product $H_k N_k^{(0)}$ are aligned can be acquired from above Equation (5), a weight of UE #k that is a product of the matrix $V_k^{(0)}$ and a matrix in which υk pieces of column vectors constituting the matrix $C_k^{(1)}$ are aligned is generated (step S204). That is, a weight $W_k$ of UE #k is expressed by Equation (6) below.

$$W_k = V_k^{(0)} [c_{k,1}^{(1)} c_{k,2}^{(1)} \ldots c_{k,\upsilon_k}^{(1)}] \quad (6)$$

In above Equation (6), $c_{k,1}^{(1)}$, $c_{k,2}^{(1)}$, . . . express the column vectors constituting the matrix $C_k^{(1)}$, and in this example, the column vectors corresponding to $\upsilon k$ pieces of the singular values are aligned in descending order of the matrix of the product $H_k V_k^{(0)}$.

As the weight $W_k$ of UE #k, which is the low-speed UE, has been thus calculated, the weight calculating unit 193 determines whether calculation of weights of all the low-speed UEs has completed (step S205). By repeating the above processing, respective weights of $K_1$ units of the low-speed UEs are calculated.

When calculation of all the low-speed UEs is completed (S205: YES), a weight of the high-speed UE is calculated next. Specifically, a linkage channel matrix L of all the low-speed UEs is generated as equation (7) below (step S206).

$$L = [H_1 H_2 \ldots H_{K_1}]^T \tag{7}$$

The linkage channel matrix in above Equation (7) is a matrix obtained by aligning channels of all the low-speed UEs. In this example, as UE #k of the subject of weight calculation is the high-speed UE, a weight with which a null is directed to all the low-speed UEs is calculated. Therefore, in the linkage channel matrix L, the channel matrix of all the low-speed UEs to which the null is directed is arranged.

The linkage channel matrix L is subjected to singular value decomposition (step S207), and is transformed into Equation (8) below.

$$L = U[S^{(1)} O][V^{(1)} V^{(0)}]^H \tag{8}$$

U is a matrix in which left singular vectors of the linkage channel matrix L are aligned, and $S^{(1)}$ is a diagonal matrix in which singular values of the linkage channel matrix L are aligned as diagonal entries. Moreover, $V^{(1)}$ is a matrix in which bases of a signal part space of the linkage channel matrix L are aligned, and $V^{(0)}$ is a matrix in which bases of a null space of the linkage channel matrix L are aligned.

By further transforming above Equation (8), Equation (9) below is acquired, $$L[V^{(1)} V^{(0)}] = U[S^{(1)} O] \tag{9}$$

and it is understood that $LV^{(0)} = O$. Therefore, by setting the matrix $V^{(0)}$ to a weight of UE #k, the channels from the base station device 100 to all the low-speed UEs can be regarded as a zero matrix, and nulls can be directed to these low-speed UEs. Accordingly, to generate a weight according to the number of streams $\upsilon k$ to be transmitted to the UE #k from the matrix $V^{(0)}$, a product of the channel matrix $H_k$ of UE #k and the matrix $V^{(0)}$ is subjected to the singular value decomposition (step S208). The result is expressed by Equation (10) below.

$$H_k V^{(0)} = X_k [Y_k O][Z_k^{(1)} Z_k^{(0)}]^H \tag{10}$$

In above Equation (10), $X_k$ is a matrix in which left singular vectors of a matrix of the product $H_k V^{(0)}$ are aligned, and $Y_k$ is a diagonal matrix in which singular values of the matrix of the product $H_k V^{(0)}$ are aligned as diagonal entries in descending order from upper left. Moreover, $Z_k^{(1)}$ is a matrix in which bases of a signal part space of the matrix of the product $H_k V^{(0)}$ are aligned, and $Z_k^{(0)}$ is a matrix in which bases of a null space of the matrix of the product $H_k V^{(0)}$ are aligned.

As the matrix $Z_k^{(1)}$ in which bases of the signal part space of the matrix of the product $H_k V^{(0)}$ are aligned can be acquired from above Equation (10), a weight of UE that is a product of the matrix $V^{(0)}$ and a matrix in which $\upsilon k$ pieces of column vectors constituting the matrix $Z_k^{(1)}$ are aligned is generated (step S209). That is, a weight $W_k$ of UE #k is expressed by Equation (11) below.

$$W_k = V^{(0)} [z_{k,1}^{(1)} z_{k,2}^{(1)} \ldots z_{k,\upsilon_k}^{(1)}] \tag{11}$$

In above Equation (11), $z_{k,1}^{(1)}$, $z_{k,2}^{(1)}$, . . . express the column vectors constituting the matrix $Z_k^{(1)}$, and in this example, the column vectors corresponding to $\upsilon k$ pieces of the singular values are aligned in descending order of the matrix of the product $H_k V^{(0)}$. For the high-speed UE, it is desirable that the number of streams $\upsilon k$ be smaller than the number of antennas of the high-speed UE. Therefore, in above Equation (11), it is desirable that the smaller number of the column vectors than the number of antennas of UE #k be aligned.

As the weight $W_k$ of UE #k, which is the high-speed UE, has been thus calculated, the weight calculating unit 193 determines whether calculation of weights of all the high-speed UEs has completed (step S210). By repeating the above processing, respective weights of $(K - K_1)$ units of the high-speed UEs are calculated.

When calculation of all the high-speed UEs is completed (S210: YES), a weight matrix W in which the weights of all of UEs #1 to #K to be the destinations at the same time are aligned is generated as in Equation (12) below (step S211).

$$W = [W_1 W_2 \ldots W_K] \tag{12}$$

This weight matrix W is output from the weight calculating unit 193 to the weight multiplying unit 120. From the weight matrix W and a power matrix described later, a transmission weight is calculated, and a transmission signal is multiplied thereby. As a result, a transmission beam in which a null is directed to the low-speed UE is formed.

Figure 9:
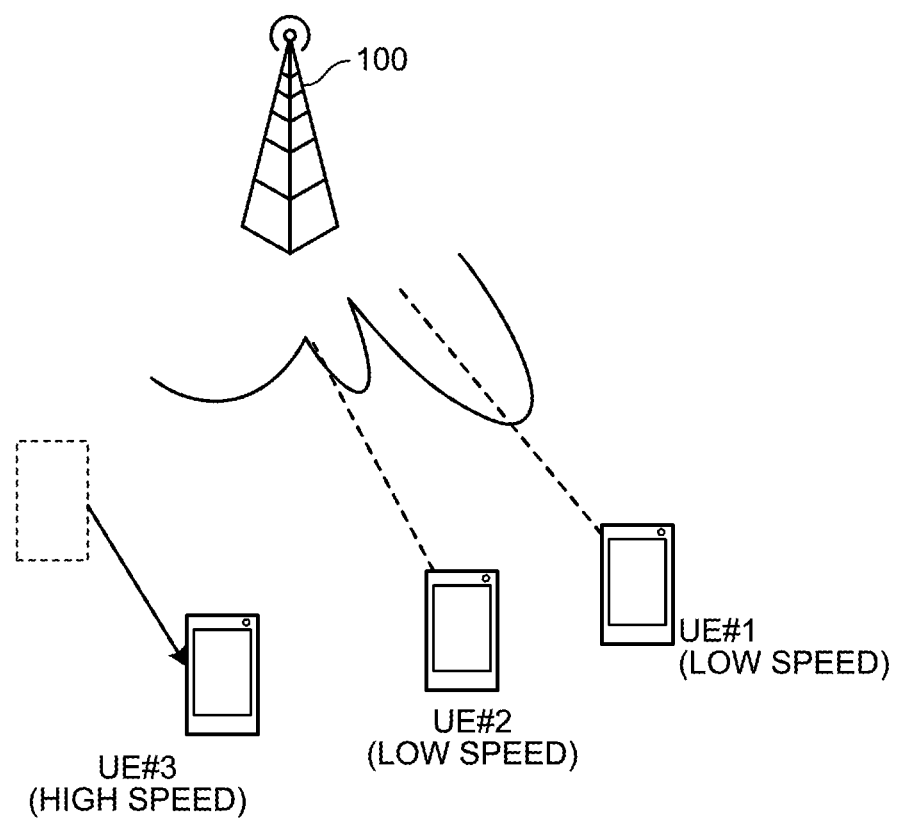
FIG. 9 depicts one example of a transmission beam.

FIG. 9 depicts one example of a transmission beam. In FIG. 9, a transmission beam for UE #1 out of UEs #1, #2 that are the low-speed UEs, and UE #3 that is the high-speed UE is depicted. As depicted in FIG. 9, while a maximum gain direction of the transmission beam is directed substantially to the direction of UE #1, a null is directed to the direction of UE #2 that is the low speed UE. Therefore, a signal addressed UE #1 does not interfere UE #2, and the inter-user interference can be reduced. Furthermore, although a null is not directed to the direction of UE #3 that is the high-speed UE, as a larger power is allocated to a transmission beam for the high-speed UE than a transmission beam for the low-speed UE as described later, deterioration of the reception quality at UE #3 can be suppressed. Moreover, as it is not necessary to direct a null to the direction of UE #3, it is not required to consider the direction of UE #3 in generation of the weight matrix described above, and the flexibility of weight matrix calculation is thus improved. As a result, the maximum gain direction of the transmission beam for UE #1 can be closer to the direction of UE #1, and the improvement in throughput by transmission beams can be achieved.

Figure 10:
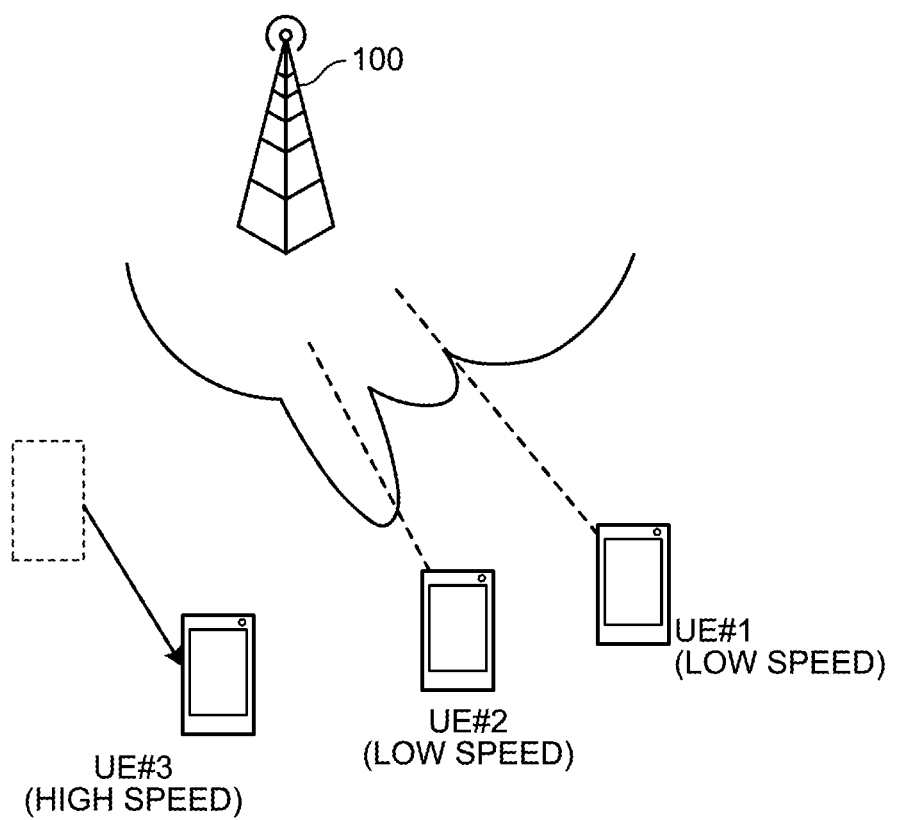
FIG. 10 depicts another example of the transmission beam.

Similarly, FIG. 10 depicts a transmission beam for UE #2 out of UEs #1, #2 that are the low-speed UEs, and UE #3 that is the high-speed UE. As depicted in FIG. 10, while a maximum gain direction of the transmission beam is directed substantially to the direction of UE #2, a null is directed to the direction of UE #1 that is the low speed UE. Therefore, a signal addressed to UE #2 does not interfere UE #1, and the inter-user interference can be reduced. Moreover, as it is not necessary to direct a null to the direction of UE #3, the maximum gain direction of the transmission beam for UE #2 can be closer to the direction of UE #2, and the throughput improvement by transmission beams can be achieved.

Figure 11:
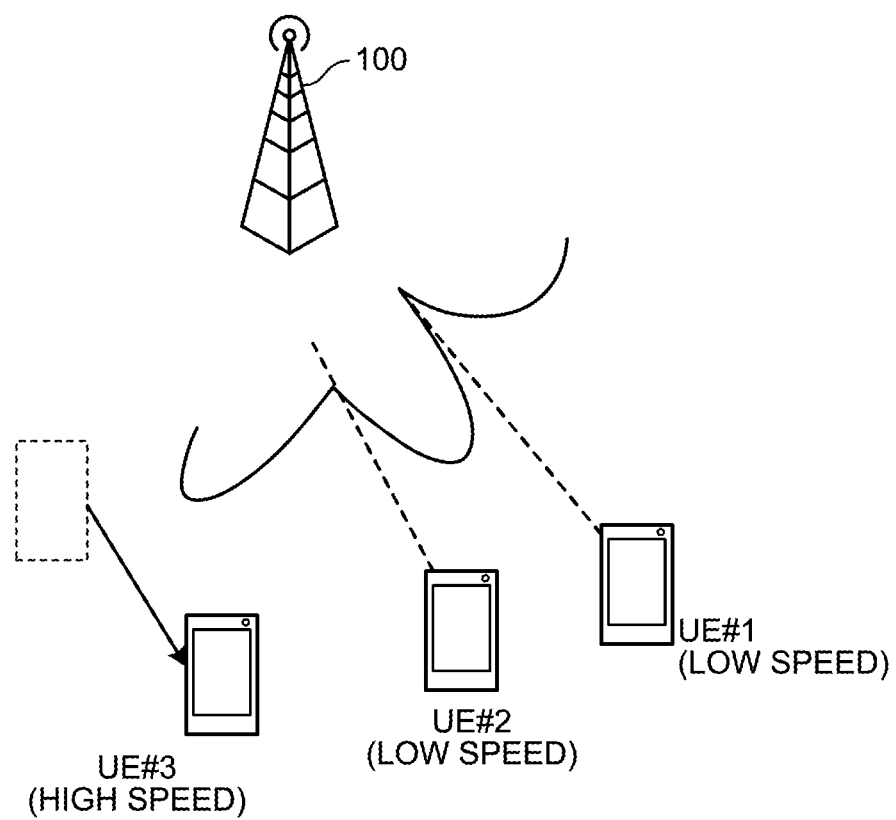
FIG. 11 depicts one example of still another example of the transmission beam.

FIG. 11 depicts a transmission beam for UE #3 out of UEs #1, #2 that are the low-speed UEs, and UE #3 that is the high-speed UE. As depicted in FIG. 11, nulls are directed to the directions of UEs #1, #2, which are the low-speed UEs. Therefore, a signal addressed to UE #3 does not interfere UEs #1, #2 and the inter-user interference can be reduced. Moreover, although the maximum gain direction of the transmission beam does not match with the direction of the UE #3 that is the high-speed UE, as a larger power is allocated to a transmission beam for the high-speed UE than a transmission beam for the low-speed UE as described later, deterioration of the reception quality at UE #3 can be suppressed.

Figure 12:
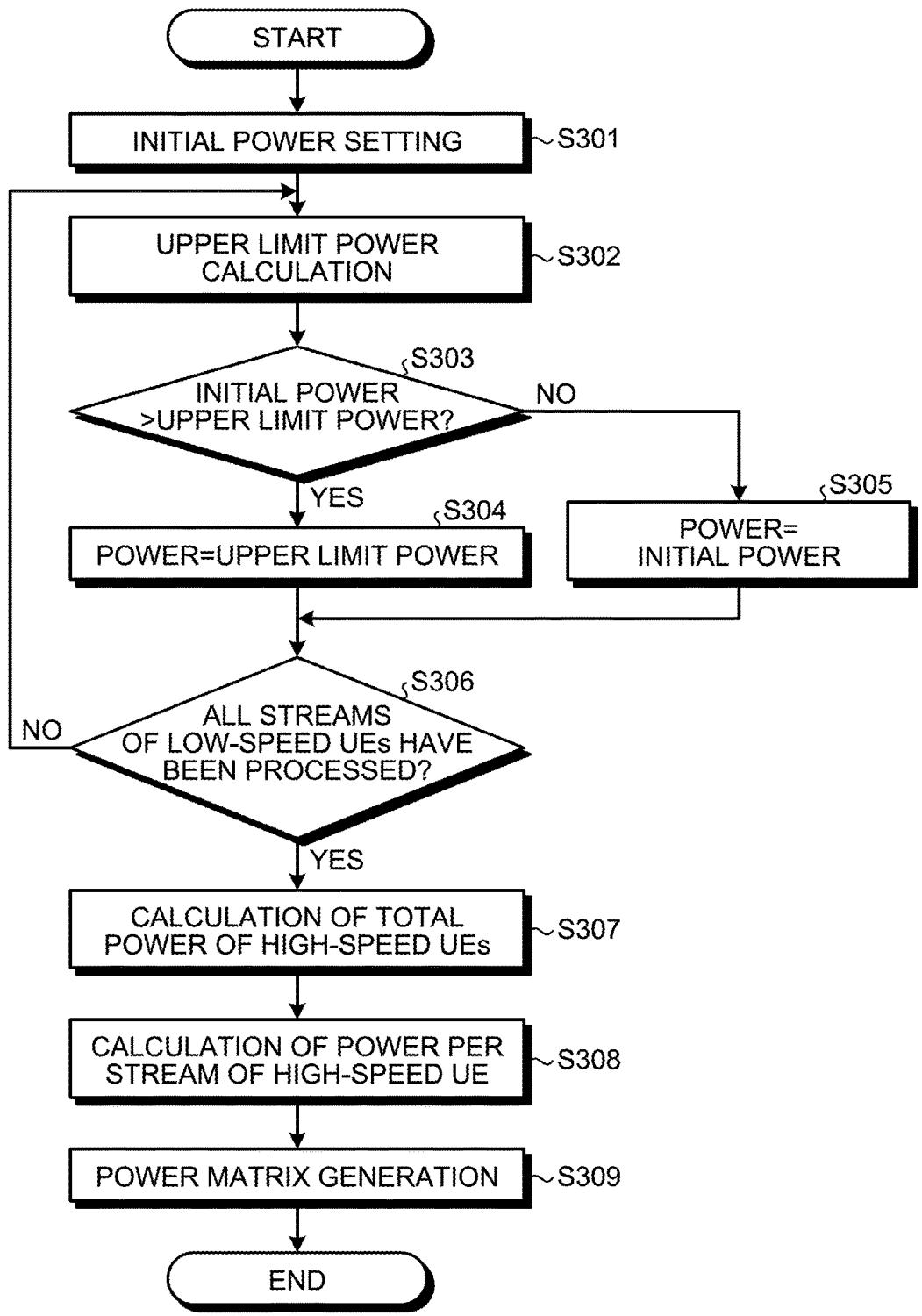
FIG. 12 is a flowchart of power-matrix generation processing according to the first embodiment.

Next, power-matrix generation processing by the power-allocation calculating unit 194 is specifically explained referring to a flowchart in FIG. 12. In the following example also, it is assumed that the scheduler unit 191 plans to transmit signals to K units of the UEs 200 at the same time, and out of these UEs, 1st to $K_1$-th UEs 200 are the low-speed UE, and $K_1+1$-th to K-th UEs 200 are the high-speed UE.

The power-allocation calculating unit 194 sets initial powers for respective streams to be transmitted to K units of the UEs 200 to be the destination at the same time (step S301). As an initial power $p^{(0)}_{k,\upsilon}$, for example, a power that is obtained by dividing a total power P in the base station by the total number of streams, or the like can be used, as indicated in Equation (13) below.

$$p^{(0)}_{k,\upsilon} = \frac{P}{\sum_{k=1}^{K} \upsilon_k} \quad (13)$$

Moreover, for the low-speed UE, an upper limit of instantaneous data rate is set, and a power for a stream to satisfy this upper limit is calculated as follows (step S302). That is, an instantaneous signal to interference and noise ratio (SINR) $\gamma_{k,\upsilon}$ of a $\upsilon$-th stream addressed to UE #k, which is the low-speed UE, is expressed by Equation (14) below.

$$\gamma_{k,\upsilon} = \frac{p_{k,\upsilon} b^2_{k,\upsilon,\upsilon}}{\sigma^2_k} \quad (14)$$

In above Equation (14), $p_{k,\upsilon}$ expresses a power for a $\upsilon$-th stream if YE #K, $b^2_{k,\upsilon,\upsilon}$ expresses an element of row $\upsilon$ and column $\upsilon$ of a matrix $B_k$ in Equation (5) (that is, $\upsilon$-th singular value of the matrix of the product $H_k V_k^{(0)}$), and $\sigma^2_k$ expresses a noise power at UE #k. Expressing a function to convert the instantaneous SINR into an instantaneous data rate as $R(\gamma_{k,\upsilon})$, a power $p_{limit}$ with which the instantaneous data rate of $\upsilon$-th stream addressed to UE #k is a predetermined value $\rho_{limit}$ is expressed by Equation (15) below.

$$p_{limit} = R^{-1}(\rho_{limit}) \frac{\sigma^2_k}{b^2_{k,\upsilon,\upsilon}} \quad (15)$$

$R^{-1}(\rho)$ expresses an inverse function of $\rho=R(\gamma)$. For example, when Shannon capacity is used as a function $R(\bullet)$, above Equation (15) is to be as Equation (16) below.

$$p_{limit} = (2^{\rho_{limit}} - 1) \frac{\sigma^2_k}{b^2_{k,\upsilon,\upsilon}} \quad (16)$$

As the function $R(\bullet)$, a mutual information amount, or a function defined by a predetermined table can be used other than Shannon capacity.

When the upper limit powers $p_{limit}$ of the respective streams are calculated, it is determined whether the initial power $p^{(0)}_{k,\upsilon}$ exceeds the upper limit powers $p_{limit}$ for each of the low-speed UEs (step S303). As a result of this determination, when it is determined that the initial power of a stream exceeds the upper limit power (step S303: YES), the power for this stream is set to a power equal to the upper limit power (step S304). On the other hand, when it is determined that the initial power of the stream is equal to or lower than the upper limit power (step S303: NO), the power of this stream is maintained at the initial power (step S305).

It is then determined whether power setting for all the streams has been completed (step S306), and when there is a stream of the low-speed UE for which a power setting has not been completed (step S306: NO), the above power setting is repeated. When the power setting for the streams of all the low-speed UEs is completed (step S306: YES), the powers of the low-speed UEs are equal to the upper limit power at the highest. As described, because powers to be allocated to the low-speed UEs are limited up to the upper limit power, an interference on the high-speed UE given by the low-speed UE is small. Moreover, an extra power obtained by limiting the power allocated to the low-speed UE is allocated to the high-speed UE.

Specifically, by subtracting a sum of the powers for the streams of the low-speed UEs from a total power in the base station device 100, a total power to be allocated to the high-speed UE is calculated (step S307). That is, by Equation (17) below, a total power $P_{hs}$ of the high-speed UE is calculated.

$$P_{hs} = P - \sum_{k=1}^{K_1} \sum_{\upsilon=1}^{\upsilon_k} p_{k,\upsilon} \quad (17)$$

The calculated total power $P_{hs}$ is distributed to respective streams of the high-speed UEs, and a power for each stream is calculated (step S308). For example, when the power is to be equally divided among the streams of the high-speed UEs, a power $p_{k,\upsilon}$ of each stream of the high-speed UEs is to be as Equation (18) below.

$$p_{k,\upsilon} = \frac{P_{hs}}{\sum_{k=K_1+1}^{K} \upsilon_k} \quad (18)$$

As the powers for all the streams of the low-speed UEs and the high-speed UEs have been thus calculated, the power-allocation calculating unit 194 generates a power matrix P in which the powers for the streams of UEs #1 to #K are aligned as diagonal entries (step S309). This power matrix P is output to the weight multiplying unit 120 from the power-allocation calculating unit 194. The weight multiplying unit 120 acquires a transmission weight from the weight matrix W and the power matrix P, and multiplies a transmission signal thereby. That is, by multiplying the user data of UEs #1 top #K to be the destinations at the same time by a product $WP^{1/2}$ of the weight matrix W and square root matrix of the power matrix P, a transmission beam in which nulls are directed to the low-speed UEs and higher powers are allocated to the high-speed UEs is formed.

As described above, according to the present embodiment, UEs are categorized into the low-speed UE and the high-speed UE according to the moving speed, and transmission weights to form a transmission beam in which directions of nulls are determined giving consideration only to the directions of the low-speed UEs out of all the UEs, and in which higher powers are allocated to the high-speed UEs are acquired. Therefore, flexibility of the transmission beam that is limited by directions of nulls increases, and it is facilitated to direct a maximum gain direction and nulls to the directions of the low-speed UEs. As a result, inter-user interference is reduced, and the throughput is improved.

Although it has been explained that a weight matrix is calculated by singular value decomposition of a linkage channel matrix in the first embodiment, the weight matrix can be calculated by using a general inverse matrix.

[b] Second Embodiment

A feature of a second embodiment is a point in that power allocation to streams of respective UEs is determined to maximize the data rate.

As configurations of a wireless communication system, a base station device, and a UE are the same as those of the first embodiment, explanation thereof is omitted. Moreover, the weight-matrix generation processing in the base station device 100 is also the same as that of the first embodiment. In the second embodiment, the power-matrix generation processing performed in the base station device 100 defers from that of the first embodiment.

Figure 13:
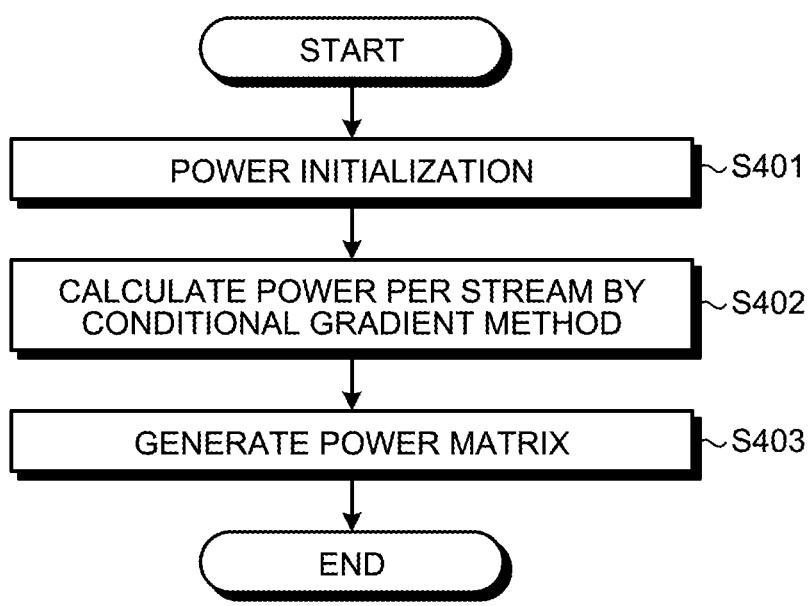
FIG. 13 is a flowchart of power-matrix generation processing according to a second embodiment.

FIG. 13 is a flowchart of the power-matrix generation processing according to the second embodiment. In the following example also, it is assumed that the scheduler unit 191 plans to transmit signals to K units of the UEs 200 at the same time, and out of these UEs, 1st to $K_1$-th UEs 200 are the low-speed UE, and $K_1+1$-th to K-th UEs 200 are the high-speed UE.

In the present embodiment, after powers for streams to be transmitted to K units of UEs #1 to #K are initialized (step S401), the powers of the respective streams are calculated as follows to maximize a total of instantaneous data rates. That is, powers to maximize a weighted total f of the instantaneous data rates expressed by Equation (19) below are determined.

$$f = \sum_{k=1}^{K} g_k \sum_{v=1}^{v_k} R(\gamma_{k,v}) \qquad (19)$$

In Equation (19), $g_k$ is a weight coefficient expressing the priority of UE #k, $v_k$ indicates the number of streams addressed to UE #k, and $\gamma_{k,v}$ indicates an instantaneous SINR of a u-th stream addressed to UE #k. Moreover, $R\gamma_{k,v}$ is a function to convert the instantaneous SINR into an instantaneous data rate.

As the total power in the base station device 100 is P in this example, a power per stream to maximize above Equation (19) is calculated by the power-allocation calculating unit 194 on condition that a sum of the powers for all the streams of UEs #1 to #K is equal to the total power P (step S402). In this calculation, for example, a conditional gradient method is used.

Specifically, for example, when all of UEs #1 to #K have a single antenna and the number of stream addressed to all of UEs #1 to #K is 1, above Equation (19) is simplified as Equation (20) below.

$$f = \sum_{k=1}^{K} g_k R(\gamma_{k,1}) \qquad (20)$$

The instantaneous SINRs of the low-speed UE and the high-speed UE are expressed by following Equations (21) and (22), respectively.

$$\gamma_{k,1} = \frac{p_{k,1}|H_k W_k|^2}{\sigma_{k,1}^2}, k = 1, 2, \ldots, K_1 \qquad (21)$$

$$\gamma_{k,1} = \frac{p_{k,1}|H_k W_k|^2}{\sigma_{k,1}^2 + \sum_{j=1,j\ne k}^{K} p_{j,1}|H_j W_j|^2}, k = K_1+1, K_1+2, \ldots, K \qquad (22)$$

For example, when the Shannon capacity is used as the function R(•), an instantaneous SINR$\gamma_{k,1}$ that maximizes Equation (20) is acquired on condition that a sum of the powers for all the streams addressed to UEs #1 to #K is equal to the total power P of the base station device 100. Subsequently, by above Equations (21) and (22), $p_{k,1}$ that is a power for a stream of each of the low-speed UE and the high-speed UE is calculated.

As the powers for all the streams of the low-speed UEs and the high-speed UEs have been thus calculated, the power-allocation calculating unit 194 generates the power matrix P in which the powers for the streams of UEs #1 to #K are aligned as diagonal entries (step S403). This power matrix P is output to the weight multiplying unit 120 from the power-allocation calculating unit 194, and a transmission signal is multiplied by a transmission weight based on the weight matrix and the power matrix P.

As described, according to the present embodiment, powers for streams of respective UEs are determined so that a total of data rates are maximized. Therefore, the data rate of the wireless communication system can be maximized, and the throughput can be improved.

In the above first and the second embodiments, the group determining unit 192 categorize the UEs 200 into two groups of the low-speed UE and the high-speed UE. However, grouping by the group determining unit 192 can be of categorizing the UEs 200 into three or more groups. That is, for example, it can be considered to categorize the UEs 200 into three groups of the low-speed UE, a medium-speed UE, and the high-speed UE. In this case, transmission weights are determined such that in a transmission beam for a low-speed UE, nulls are directed to all the other low-speed UEs, in a transmission beam for a medium-speed UE, nulls are directed to all the low-speed UEs, and in a transmission beam for a high-speed UE, nulls are directed to all the low-speed UEs and the medium-speed UEs.

Specifically, suppose that the scheduler unit 191 plans to transmit signals to K units of the UEs 200 at the same time, and out of the UEs 200, the 1st to $K_1$-th UEs 200 are the low-speed UE, the $K_1+1$-th to $K_2$-th UEs 200 are the medium-speed UE, and the $K_2+1$-th to K-th UEs 200 are the high-speed UE. IN this case, weights $W_1$ to $W_k$ of the respective UEs 200 are determined to satisfy an equation below.

$$[ H_1^T \ \ldots \ H_{K_1}^T \ H_{K_1+1}^T \ \ldots \ H_{K_2}^T \ H_{K_2+1}^T \ \ldots \ H_K^T ]^T \cdot$$

$$[ W_1 \ \ldots \ W_{K_1} \ W_{K_1+1} \ \ldots \ W_{K_2} \ W_{K_2+1} \ \ldots \ W_K ] =$$

$$\begin{bmatrix} H_1 W_1 & O & O & \ldots & O & O & \ldots & O \\ O & M & O & M & M & O & M \\ O & H_{K_1} W_{K_1} & O & \ldots & O & O & \ldots & O \\ H_{K_1+1} W_1 & \ldots & H_{K_1+1} W_{K_1} & H_{K_1+1} W_{K_1+1} & \ldots & H_{K_1+1} W_{K_2} & O & \ldots & O \\ M & O & M & M & O & M & M & O & M \\ H_{K_2} W_1 & \ldots & H_{K_2} W_{K_1} & H_{K_2} W_{K_1+1} & \ldots & H_{K_2} W_{K_2} & O & \ldots & O \\ H_{K_2+1} W_1 & \ldots & H_{K_2+1} W_{K_1} & H_{K_2+1} W_{K_1+1} & \ldots & H_{K_2+1} W_{K_2} & H_{K_2+1} W_{K_2+1} & \ldots & H_{K_2+1} W_K \\ M & O & M & M & O & M & M & O & M \\ H_K W_1 & \ldots & H_K W_{K_1} & H_K W_{K_1+1} & \ldots & H_K W_{K_2} & H_K W_{K_2+1} & \ldots & H_K W_K \end{bmatrix}$$

To calculate these weights $W_1$ to $W_k$, the singular value decomposition can be used similarly to the first embodiment, or the general inverse matrix can be used.

Figure 14:
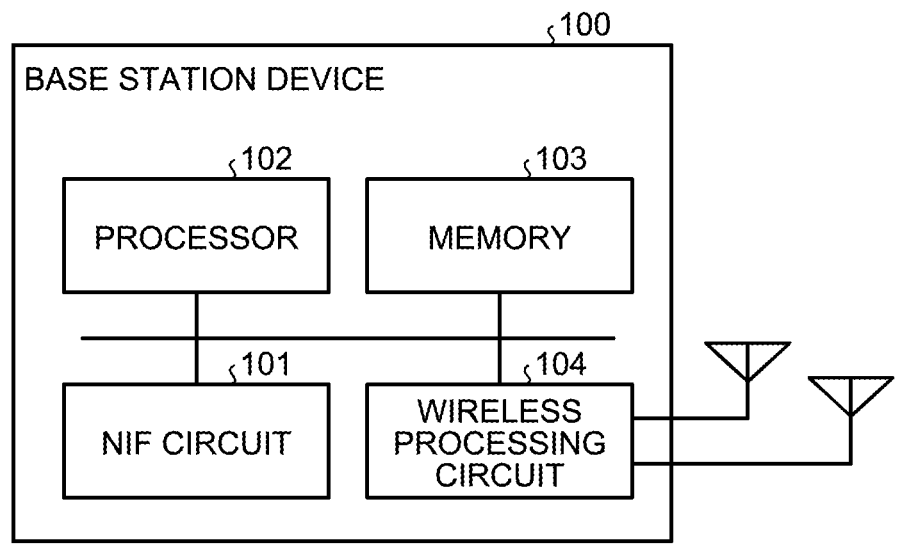
FIG. 14 is a block diagram depicting a hardware configuration example of the base station device.
Figure 15:
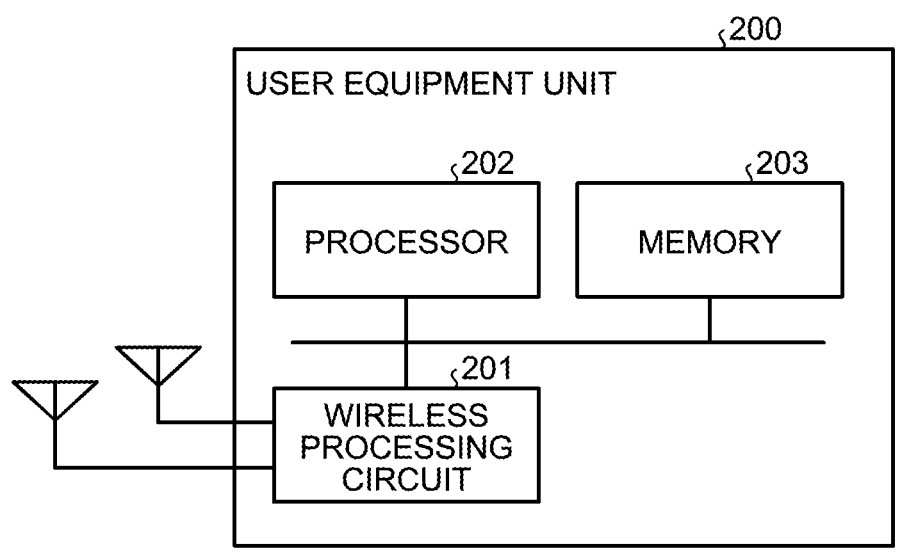
FIG. 15 is a block diagram of a hardware configuration example of the user equipment device.
Figure 16:
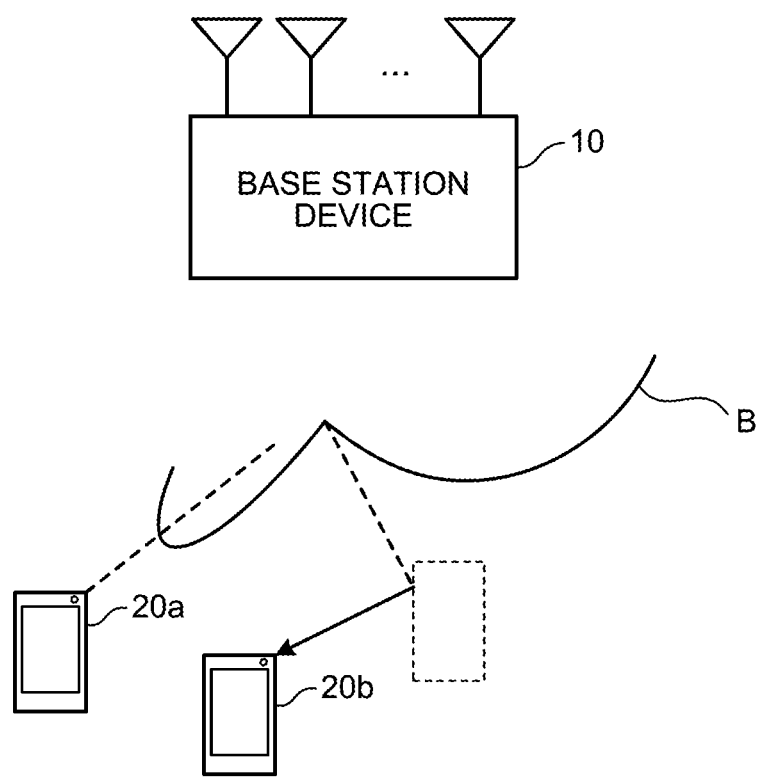
FIG. 16 depicts a specific example of the transmission beam.

The base station device 100 and the UEs 200 according to the above first and the second embodiments have, for example, hardware configurations depicted in FIGS. 14 and 15.

As depicted in FIG. 14, the base station device 100 includes a network interface (NIF) circuit 101, a processor 102, a memory 103, and a wireless processing circuit 104. The NIF circuit 101 is an interface circuit to connect to a higher-level device such as a gateway device of a backbone network, for example.

The processor 102 has, for example, a central processing unit (CPU), a field programmable gate array (FPGA), a digital signal processor (DSP), or the like, and performs various kinds of processing using the memory 103. The processor 102 corresponds to, for example, a processing unit such as the user-data generating units 110-1 to 110-M, the weight multiplying unit 120, the control-signal generating unit 130, transmission processing units 140-1 to 140-N, the reception processing unit 180, and the downlink control unit 190 depicted in FIG. 2.

The memory 103 has, for example, a random-access memory (RAM), a read only memory (ROM), or the like, and stores various kinds of data used in processing by the processor 102.

The wireless processing circuit 104 is a circuit that subjects a signal to wireless processing, and transmits and receives signals through an antenna. The wireless processing circuit 104 corresponds to, for example, a processing unit such as the wireless-transmission processing units 150-1 to 150-N, the wireless-reception processing units 160-1 to 160-N, and the channel estimating unit 170 depicted in FIG. 2.

Furthermore, as depicted in FIG. 15, the UE 200 has a wireless processing circuit 201, a processor 202, and a memory 203. The wireless processing circuit 201 is a circuit that subjects a signal to wireless processing, and transmits and receives signals through an antenna. The wireless processing circuit 201 corresponds to, for example, a processing unit such as the wireless-reception processing units 210-1 to 210-L, the reception processing units 220-1 to 220-L, the channel estimating unit 230, the transmission processing units 270-1 to 270-L, and the wireless-transmission processing units 280-1 to 280-L depicted in FIG. 6.

The processor 202 has, for example, a CPU, an FPGA, a DSP, or the like, and performs various processing using the memory 203. The processor 202 corresponds to, for example, a processing unit such as the demodulating unit 240, the error-correction decoding unit 250, and the reception-confirmation generating unit 260 depicted in FIG. 6.

The memory 203 has, for example, a RAM, a ROM, or the like, and stores various kinds of data used in processing by the processor 202.

The hardware configurations depicted in FIGS. 14 and 15 are only one example, and the base station device 100 and the UE 200 can have other physical configurations. For example, the base station device 100 can be divided into a baseband processing unit and a wireless unit, and can have a configuration that the baseband processing unit and the wireless unit are connected through an optical fiber. In this case, to the baseband processing unit, multiple wireless units can be connected, and each wireless unit can perform the MU-MIMO independently, or perform the MU-MIMO with the multiple wireless units as distributed antennas.

According to one aspect of the base station device, the terminal device, and the wireless transmission method disclosed in the present application, inter-user interference can be reduced, and the throughput thereof can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
a processor that executes a process including
determining which group of a first group and a second group each of a plurality of terminal devices belongs to,
generating a transmission weight to form a transmission beam in which a direction of null is determined in consideration of a direction of a terminal device that belongs to the first group and without consideration of a direction of a terminal device that belongs to the second group, and
multiplying a signal addressed to the terminal devices by the generated transmission weight; and a transmitter that transmits the signal multiplied by the transmission weight from a plurality of antennas simultaneously, wherein the determining includes determining, based on a moving speed of each of the terminal devices, which group of the first group and the second group each of the terminal devices belongs to, the second group having a moving speed higher than the first group.

2. The base station device according to claim 1, wherein the process further includes determining a power to be allocated to a transmission beam for each of the terminal devices such that a total of reception data rates in the terminal devices is maximized.

3. The base station device according to claim 1, wherein the generating includes generating the transmission weight to form a transmission beam that is for one of the terminal devices belonging to the first group, and in which nulls are directed to other terminal devices belonging to the first group.

4. The base station device according to claim 1, wherein the generating includes generating the transmission weight to form a transmission beam that is for the terminal devices belonging to the second group, and in which nulls are directed to all the terminal devices belonging to the first group.

5. The base station device according to claim 1, wherein the process further includes limiting a power to be allocated to a transmission beam for a terminal device belonging to the first group, and allocating an extra power obtained by the limiting, to a transmission beam for a terminal device belonging to the second group.

6. A wireless transmission method comprising:

determining which group of a first group and a second group each of a plurality of terminal devices belongs to;

generating a transmission weight to form a transmission beam in which a direction of null is determined in consideration of a direction of a terminal device that belongs to the first group and without consideration of a direction of a terminal device that belongs to the second group;

multiplying a signal addressed to the terminal devices by the generated transmission weight; and transmitting the signal multiplied by the transmission weight from a plurality of antennas simultaneously, wherein the determining includes determining, based on a moving speed of each of the terminal devices, which group of the first group and the second group each of the terminal devices belongs to, the second group having a higher moving speed than the first group.

7. A terminal device comprising:

a receiver that receives a signal multiplied by a transmission weight to form a transmission beam in which a direction of null is determined in consideration of a direction of a terminal device belonging to a first group and without consideration of a direction of a terminal device that belongs to a second croup, based on a result of determination which group of the first group and the second group each of a plurality of terminal devices belongs to; and a demodulator that demodulates a reception signal that is received by the receiver, wherein the receiver receives the signal multiplied by the transmission weight to form the transmission beam that has the shape considering only the terminal device belonging to the first group, out of the first group and the second group a moving speed of the second group is higher than a moving speed of the first group.

* * * * *